(12) United States Patent
Wu et al.

(10) Patent No.: US 12,054,594 B2
(45) Date of Patent: Aug. 6, 2024

(54) BACTERIA REPELLANT POLYMER COMPOSITES

(71) Applicant: Ka Shui Plastic Technology Co. Ltd., Hong Kong (CN)

(72) Inventors: You Wu, Hong Kong (CN); Yan-Hua Zhao, Hong Kong (CN); Hoi-Kuan Kong, Hong Kong (CN); Ho-Man Au, Hong Kong (CN); Wai-Chung Peter Wong, Hong Kong (CN); Cheuk-Nang Daniel Sung, Hong Kong (CN); Yuen-Fat Lee, Hong Kong (CN)

(73) Assignee: Ka Shui Plastic Technology Co. Ltd., Hong Kong (CN)

( * ) Notice: Subject to any disclaimer, the term of this patent is extended or adjusted under 35 U.S.C. 154(b) by 596 days.

(21) Appl. No.: 17/194,573

(22) Filed: Mar. 8, 2021

(65) Prior Publication Data
US 2022/0282053 A1    Sep. 8, 2022

(51) Int. Cl.
*C08J 7/12* (2006.01)

(52) U.S. Cl.
CPC ........... *C08J 7/123* (2013.01); *C08J 2323/06* (2013.01); *C08J 2323/12* (2013.01); *C08J 2325/06* (2013.01); *C08J 2453/02* (2013.01)

(58) Field of Classification Search
CPC .......................................................... C08J 7/12
USPC ....................................................... 523/122
See application file for complete search history.

(56) References Cited

U.S. PATENT DOCUMENTS

| 6,096,564 A | 8/2000 | Denes et al. |
| 8,927,616 B2 | 1/2015 | Thomas et al. |
| 9,498,934 B2 | 11/2016 | Paxson et al. |
| 9,683,197 B2 | 6/2017 | Aizenberg et al. |
| 10,030,108 B1 | 7/2018 | Lau et al. |
| 10,525,614 B2 | 1/2020 | Lau et al. |
| 2018/0208753 A1 | 7/2018 | Lau et al. |
| 2019/0263981 A1* | 8/2019 | Wu .................. A01N 47/20 |
| 2020/0017658 A1 | 1/2020 | Liu et al. |

FOREIGN PATENT DOCUMENTS

| CA | 2234538 A1 | 10/1998 |
| CA | 2235090 A1 | 10/1998 |
| CA | 2241380 A1 | 12/1998 |
| CA | 2244049 A1 | 1/1999 |
| CN | 111793284 A | 10/2020 |
| DE | 19700082 A1 | 7/1998 |
| DE | 19818958 A1 | 11/1999 |
| WO | 2000/044818 A1 | 8/2000 |
| WO | 2012/058605 A1 | 5/2012 |
| WO | 2013/003373 A1 | 1/2013 |
| WO | 2015/009257 A1 | 1/2015 |

OTHER PUBLICATIONS

First Office Action of CN2021102496001 issued from the China National Intellectual Property Administration on Apr. 13, 2023.

* cited by examiner

*Primary Examiner* — Deve V Hall

(74) *Attorney, Agent, or Firm* — S&F/WEHRW

(57) ABSTRACT

A method for preparing a bacteria repellant masterbatch, bacteria repellant polymer composites comprising the same, and compositions and articles prepared therefrom.

20 Claims, 8 Drawing Sheets

BACTERIA REPELLANT POLYMER COMPOSITES

TECHNICAL FIELD

The present disclosure relates to the field of functional plastics, in particular to polymer composites exhibiting bacteria repellant properties and methods of preparation and use thereof.

BACKGROUND

Imparting plastics with antimicrobial is not only of great significance for basic research, but also of great significance in practical applications. However, people are paying more and more attention to the safety of antimicrobial agents used in polymers. For example, it is reported that silver nanoparticles can enter the brain, and over time can cause neuronal degeneration and necrosis. There are also reports that nano-silver has the risk of mutating fish embryos. In addition, bacteria that are overexposed to antibiotics/antimicrobial agents are prone to mutations and resistance. Public health officials in Nevada reported a case of death from an incurable disease in Reno in September 2020. Tests showed that the patient was infected with antibiotic resistant bacteria, which could withstand 26 different antibiotics.

There is a strong need to transform conventional sterilization techniques into safe, non-leaching, and pollution-free methods that can prevent bacteria from attaching rather than killing them. According to early basic research, to achieve this transformation, the surface energy of the substrate plays a vital role. When the initial surface tension of the substrate surface is 20-30 mN/m (ie, low-energy surface), the long-term adhesion of microorganisms is the least. Silicone and fluoropolymers are two well-known antifouling polymers, which are used as the basic components of coatings due to their low surface energy properties. Because of its hydrophilicity and steric hindrance to various biological fluids (such as proteins, bacteria and viruses), polyethylene glycol coatings are also widely used as anti-fouling modifiers. Conventional anti-fouling modification of polymers is usually achieved by surface modification and coating a hydrophilic layer on the polymer surface after compression molding.

However, traditional bacteria repellant agents have low melting points and are often liquid or waxy at room temperature. If they are directly blended with the base polymer for injection molding and other product production processes, the additives will melt in advance and coat the surface of the screw resulting in screw slippage and injection failure Therefore, traditional antimicrobial adsorption modified plastics need to add additional melt processing steps, such as twin-screw extrusion, which significantly increases costs and lacks practicality. Moreover, the compatibility of traditional resins with the additives in the molten state is not ideal. In the masterbatch prepared by traditional melt processing, the typical value of the mixing amount of bacteria repellant additives is 10%. The addition amount in the final processing is also between 15-30%, which lacks practicality. At the same time, this method will cause different degrees of additive precipitation during the production process, which affects product stability.

There thus exists a need for improved methods for preparing bacteria repellant composites that addresses or overcomes at least some of the issues raised above.

SUMMARY

In order to solve the problem of screw slippage when the bacteria repellant masterbatch is directly used for injection molding and additional melt processing is required, which can result in high processing and production costs, lack of practicability, and low stability of processed products, the present disclosure provides a bacteria repellant masterbatch comprising a porous polymer. The bacteria repellant masterbatch can be directly mixed with the basic thermoplastic polymer and directly subjected to thermoplastic processing and molding without the need of an additional melting and pelletizing processes. Moreover, the screw will not slip during the thermoplastic processing and molding process, which has high practicability. Advantageously, the porous base polymer of the bacteria repellant masterbatch has open cell, which results in a higher carrying capacity of the bacteria repellant agent, and the processed products have good stability.

In a first aspect, provided herein is a method of preparing a bacteria repellant polymer composite, the method comprising exposing the surface of a porous thermoplastic polymer to plasma thereby forming a surface activated porous thermoplastic polymer; blending the surface activated porous thermoplastic polymer with a bacteria repellant agent thereby grafting the bacteria repellant agent to a surface of the activated porous thermoplastic polymer and forming a masterbatch; and combining the masterbatch with a thermoplastic polymer thereby forming the bacteria repellant polymer composite, wherein the bacteria repellant agent is a non-ionic surfactant.

In certain embodiments, the bacteria repellant polymer composite does not comprise a bactericide.

In certain embodiments, the porous polymer has a porosity between 50-95%.

In certain embodiments, the method further comprises the step of injection molding the bacteria repellant polymer composite.

In certain embodiments, the method does not further comprise a screw extrusion step, Banburry mixing step or a melt blending step.

In certain embodiments, the porous thermoplastic polymer is selected from the group consisting of polyurethane, styrene-ethylene-butylene-styrene block thermoplastic elastomer, polyolefin elastomer, thermoplastic polyester elastomer, polyethylene, polypropylene, polystyrene, styrene-acrylonitrile copolymer, acrylonitrile-butadiene-styrene terpolymer, terephthalic acid-tetramethylcyclobutanediol-cyclohexanediol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate-based copolymer, methyl methacrylate-butadiene-styrene terpolymer, and combinations thereof.

In certain embodiments, the porous thermoplastic polymer is selected from the group consisting of polyethylene, polypropylene, polystyrene, acrylonitrile-butadiene-styrene terpolymer, and combinations thereof.

In certain embodiments, the non-ionic surfactant is selected from the group consisting of a fatty alcohol polyoxyalkylene ether, a polyoxyalkylene fatty acid, a polyoxyalkylene sorbitan, a polyoxyalkylene sorbitan fatty acid ester, a polyether glycol, and combinations thereof.

In certain embodiments, the non-ionic surfactant is selected from the group consisting of polyoxyethylene sorbitol hexaoleate, polyoxyethylene sorbitan monolaurate, polyoxyethylene lauryl ether, polyoxyethylene hydrogenated castor oil, polyoxyethylene cetyl/octadecyl ether, allyl polyethylene glycol, methoxypolyglycol silane, polyoxyethylene acrylate, polyoxyethylene methacrylate, polyoxyethylene vinyl ether, polyoxypropylene glycol, polyoxypropylene amine, polyoxypropylene acrylate, polyoxypropylene methacrylate, polyoxypropylene glyceryl ether, and combinations thereof.

In certain embodiments, the non-ionic surfactant is selected from the group consisting of ceteareth-20, poly(ethylene glycol) sorbitol hexaoleate, polysorbate 80, PEG-40 hydrogenated castor oil, and combinations thereof.

In certain embodiments, the non-ionic surfactants comprising polyethylene glycol groups have polyethylene glycol groups having an average molecular weight of 132 to 4,400 Da.

In certain embodiments, the mass ratio of the bacteria repellant agent to the porous thermoplastic polymer is 1:9 to 4:1.

In certain embodiments, the thermoplastic polymer is selected from the group consisting of polyurethane, styrene-ethylene-butylene-styrene block thermoplastic elastomer, polyolefin elastomer, thermoplastic polyester elastomer, thermoplastic vulcanizate, polyethylene, polypropylene, polystyrene, styrene-acrylonitrile copolymer, acrylonitrile-butadiene-styrene terpolymer, terephthalic acid-tetramethylcyclobutanediol-cyclohexane glycol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate copolymer, methyl methacrylate-butadiene-styrene terpolymer, and combinations thereof.

In certain embodiments, the thermoplastic polymer is selected from the group consisting of polyethylene, polypropylene, polystyrene, terephthalic acid-tetramethylcyclobutanediol-cyclohexane glycol copolymer, styrene-ethylene-butylene-styrene block thermoplastic elastomer, acrylonitrile-butadiene-styrene terpolymer, polycarbonate, thermoplastic vulcanizate, and combinations thereof.

In certain embodiments, the mass ratio of the masterbatch and the thermoplastic polymer is between 1:99 to 1:4.

In certain embodiments, the method further comprises the step of combining the masterbatch with one or more additives selected from the group consisting of antioxidants, brighteners, nucleating agents, and anti-ester exchange agents.

In certain embodiments, the method comprises exposing the surface of a porous thermoplastic polymer selected from the group consisting of polyethylene, polypropylene, polystyrene, acrylonitrile-butadiene-styrene terpolymer, and combinations thereof, wherein the porous thermoplastic polymer has a porosity of 60-95% to plasma selected from oxygen, nitrogen, carbon dixoide, argon, and combinations thereof thereby forming a surface activated porous thermoplastic polymer; blending the surface activated porous thermoplastic polymer with a bacteria repellant agent selected from the group consisting of ceteareth-20, poly(ethylene glycol) sorbitol hexaoleate, polysorbate 80, PEG-40 hydrogenated castor oil, and combinations thereof, wherein the bacteria repellant agent and the porous thermoplastic polymer are present in a mass ratio of 1:1 to 4:1, respectively; thereby grafting the bacteria repellant agent to a surface of the activated porous thermoplastic polymer and forming a masterbatch; combining the masterbatch with a thermoplastic polymer in a mass ratio of 1:99 to 10:90, respectively; thereby forming the bacteria repellant polymer composite; and injection molding the bacteria repellant polymer composite.

In certain embodiments, the bacteria repellant polymer composite is not subjected to a screw extrusion step, Banburry mixing step or a melt blending step.

In certain embodiments, the bacteria repellant polymer composite does not comprise a bactericide.

In a second aspect provided herein is a bacteria repellant polymer composite prepared in accordance with a method described herein.

In a certain embodiments, the porous thermoplastic is selected from the group consisting of polyolefins, cyclic polyolefins, acrylics, acetates, styrenes, polyesters, polycarbonates, polyurethanes, copolymers of thermoplastic elastomers, blends and/or copolymers thereof.

In a certain embodiments, the porous thermoplastic is selected from the group consisting of polyurethane (TPU), styrene-ethylene-butylene-styrene block thermoplastic elastomer (SEBS), polyolefin elastomer (POE), and thermoplastic polyester elastomer (TPEE), thermoplastic vulcanizate (TPV), polyethylene (PE), polypropylene (PP), polystyrene (PS), styrene-acrylonitrile copolymer (SAN), acrylonitrile-butadiene-styrene terpolymer (ABS), terephthalic acid-tetramethylcyclobutanediol-cyclohexanediol copolymer (PCTG), polylactic acid (PLA), polymethyl methacrylate (PMMA), poly-p-phenylene Ethylene dicarboxylate (PET), polycarbonate (PC), polymethylpentene (PMP), polyamide (PA), polyvinyl chloride (PVC), ethylene-vinyl acetate copolymer (EVA), styrene-methacrylate copolymer, methyl methacrylate-butadiene-styrene terpolymer (MBS), blends and/or copolymers thereof.

In certain embodiments, the porous thermoplastic has open cell. In certain embodiments, the porous thermoplastic has a porosity higher than 60%, higher than 70%, higher than 80%, higher than 90%, or higher than 95%. The pore ratio can be between 10-95%. The porous thermoplastic can have a specific surface area between 0.5-2.0 $m^2/g$. The porous thermoplastic can have a bulk density is 30-250 g/L.

In certain embodiments, the porous thermoplastic has pores having a diameter between 20-120 μm.

In certain embodiments, the plasma used in the plasma surface treatment is atmospheric pressure plasma or vacuum plasma formed by one or more combinations of oxygen, argon, nitrogen and carbon dioxide. In certain embodiments, plasma treatment time is between 10-750 seconds at a power between 10-1,000 W.

The bacteria repellant agent is one or more of linear non-ionic surfactants and multi-arm non-ionic surfactants The bacteria repellant composite can further comprise one or more additives. Exemplary additives include antioxidants, brighteners, nucleating agents, and anti-ester exchange agents.

In certain embodiments, the non-ionic surfactant is fatty alcohol polyoxyalkylene ether, polyoxyalkylene fatty acid ester, polyoxyalkylene sorbitan, polyoxyalkylene sorbitol fatty acid ester.

In certain embodiments, the non-ionic surfactant is selected from the group consisting of polyoxyethylene sorbitan hexaoleate, polyoxyethylene sorbitan monolaurate, polyoxyethylene lauryl ether, polyoxyethylene hydrogenated castor, sesame oil, polyoxyethylene cetyl/octadecyl ether, allyl polyethylene glycol, methoxy polyethylene glycol silane, polyoxyethylene acrylate, polyoxyethylene methacrylate, polyoxyethylene, polyoxypropylene glycol, polyoxypropylene amine, polyoxypropylene acrylate, polyoxypropylene methacrylate, polyoxypropylene glyceryl ether, and analogs and/or mixtures thereof.

In certain embodiments, the non-ionic surfactant has a molecular weight in the range of 132 Da to 4,400 Da.

In certain embodiments, the masterbatch and the thermoplastic polymer are blended in a homogeneous melt state or a heterogeneous solid-liquid state.

In certain embodiments, the masterbatch and the thermoplastic polymer are blended under normal temperature or heating conditions, mechanically, and under normal pressure or negative pressure.

In certain embodiments, the bacteria repellant agent is present in the masterbatch at 20-80 wt % relative to the weight of the porous thermoplastic polymer and the bacteria repellant agent.

The application of the masterbatch with bacteria repellant properties described above includes application to the preparation of a plastic article to endow the product with bacteria repellant properties.

In certain embodiments, the preparation of the plastic article with bacteria repellant properties includes the following steps: directly mixing the masterbatch with a thermoplastic polymer and then thermoplastic processing and forming thereby forming the plastic article with bacteria repellant function.

In certain embodiments, the thermoplastic polymer includes polyurethane, styrene-ethylene-butylene-styrene block thermoplastic elastomer, polyolefin elastomer, thermoplastic polyester elastomer, thermoplastic vulcanizate, polyethylene, polypropylene, polystyrene, styrene-acrylonitrile copolymer, acrylonitrile-butadiene-styrene terpolymer, terephthalic acid-tetramethylcyclobutanediol-cyclohexanediol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate copolymer, methyl methacrylate-butadiene-styrene terpolymer, and copolymers and/ or mixtures thereof.

In certain embodiments, the mass ratio of the masterbatch to the thermoplastic polymer is between 1:2 to 1:9.

In certain embodiments, the thermoplastic processing and molding includes one or more of injection molding, blow molding, thermocompression molding, extrusion molding, casting molding, injection molding, and spinning molding.

In certain embodiments, the methods described herein utilize porous thermoplastic polymers comprising open cell, which present a high specific surface area to plasma treatment and subsequent grafting of the bacteria repellant agent, and which results in a more stable bonding structure. At the same time, the methods described herein can combine with plasma surface treatment technology to assist mixing, so that the bacteria repellant agent can be more stably and efficiently grafted and bonded to the porous thermoplastic polymer. In certain embodiments, the carrying capacity of the bacteria repellant agent reaches 20-80 wt % of the masterbatch relative to the weight of the bacteria repellant agent and porous thermoplastic polymer. The thus prepared masterbatch can exhibit excellent bacteria repellant properties.

Advantageously, the masterbatch prepared in accordance with the methods described herein has a dry surface, and the combination of the bacteria repellant agent and the substrate is stable, can be directly mixed with the thermoplastic polymer and directly subjected to thermoplastic processing without the need for additional melting and granulation, which can significantly reduce processing costs. Moreover, the screw will not slip during the thermoplastic processing and molding process when processing the bacteria repellant polymer composite.

BRIEF DESCRIPTION OF THE DRAWINGS

The appended drawings, where like reference numerals refer to identical or functionally similar elements, contain figures of certain embodiments to further illustrate and clarify the above and other aspects, advantages and features of the present disclosure. It will be appreciated that these drawings depict exemplary embodiments and as such are not intended to limit the scope of the present disclosure. The present disclosure will be described and explained with additional specificity and detail through the use of the accompanying drawings.

DETAILED DESCRIPTION

Figure 1:
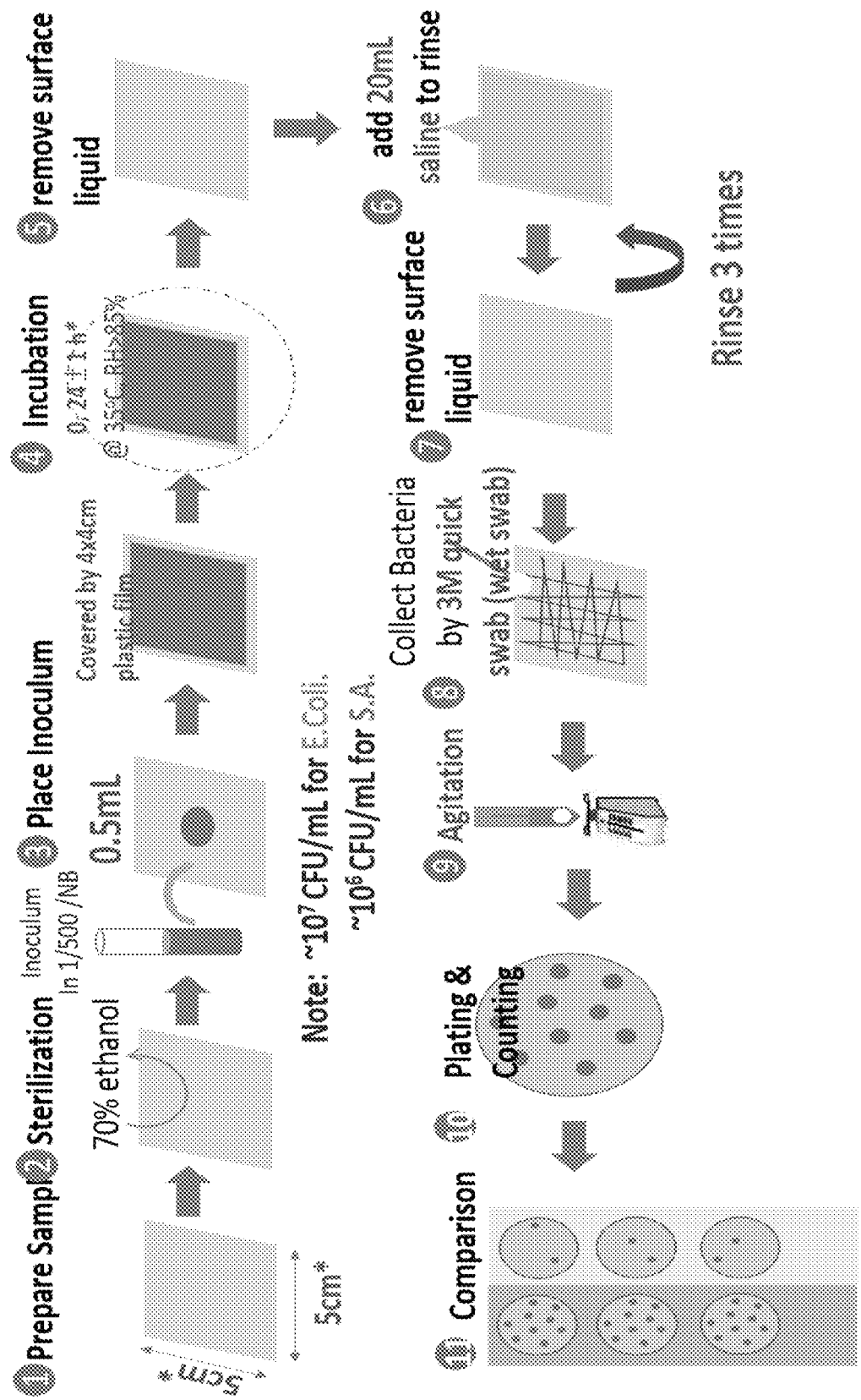
FIG. 1 depicts graphs showing the bacteria repellant testing procedure according to ASTM WK66122.

References in the specification to "one embodiment", "an embodiment", "exemplary embodiment", etc. mean that the described embodiment may include a particular feature, structure, or characteristic, but may not be every embodiment. Including the specific feature, structure or characteristic. Moreover, such phrases do not necessarily refer to the same embodiment. In addition, when a specific feature, structure or characteristic is described in conjunction with a certain embodiment, no matter whether it is explicitly described or not, it is considered that the effect of applying the characteristic, structure or characteristic to other embodiments is within the scope of knowledge of those skilled in the art.

Values expressed in ranges should be interpreted in a flexible way, including not only the values explicitly listed as the limits of the range, but also all individual values or subranges included in the range, as if each value and subrange were clearly stated. For example, a concentration range of "about 0.1% to about 5%" should be construed to include not only the explicitly listed about 0.1% to about 5% by weight, but also individual concentrations within the specified range (for example, 1%, 2%, 3% and 4%) and sub-ranges (e.g. 0.1% to 0.5%, 1.1% to 2.2% and 3.3% to 4.4%).

As described herein, unless otherwise stated, the term "a" or "an" is used to include one or more than one, and the term "or" is used to refer to a non-exclusive "or." In addition, when the terms or terms used herein are not otherwise defined, they should be understood as being used only for the purpose of description and not for the purpose of limitation. In addition, all publications, patents, and patent documents mentioned in the specification are incorporated herein by reference in their entirety, as if individually incorporated by reference. If the usage between this document and those documents incorporated by reference is inconsistent, the usage in the cited reference should be considered as a supplement to this document. For irreconcilable inconsistencies, the usage in this document shall prevail.

In the manufacturing method described in the specification, the steps can be performed in any order without departing from the principle of the present invention, except that the time or operation sequence is clearly stated. It is stated in the claims that a step is performed first, and then several other steps are performed. It should be considered that the first step is performed before any other steps, and other steps can be performed in any other steps, unless in other steps the sequence is further listed in the step. For example, a claim stating "step A, step B, step C, step D, and step E" should be interpreted as meaning that step A is performed first, and step E is performed last, and steps B, C, and D can be used in steps A and E They are executed in any order, and these orders still fall within the literal scope of the process claimed by the claims. Likewise, a given step or sub-step can be repeated.

In addition, unless the claims clearly state that they are executed separately, the specified steps can be executed simultaneously. For example, the required step of doing X and the required step of doing Y can be performed simultaneously in a single operation, and such a process will fall within the literal scope of the claimed process.

In addition, the singular forms "a", "an" and "the" may include plural indicators unless the context clearly dictates otherwise.

The term "about" may allow a range of values or a degree of variability within a range, for example, within 10% or 5% of a specified value or specified range of the range.

Unless the context clearly dictates otherwise, the term "independently selected from" means that the mentioned groups are the same, different, or a mixture thereof. Therefore, under this definition, "X1, X2, and X3 are independently selected from inert gases" will include the following schemes, for example, when X1, X2 and X3 are all the same, X1, X2 and X3 are completely different, where X1 and X2 are the same, but X3 is different, and other similar arrangements.

The present disclosure provides a method of preparing a bacteria repellant masterbatch, the method comprising exposing the surface of a porous thermoplastic polymer to plasma thereby forming a surface activated porous thermoplastic polymer; contacting the surface activated porous thermoplastic polymer with a bacteria repellant agent thereby grafting the bacteria repellant agent to a surface of the activated porous thermoplastic polymer and forming a masterbatch, wherein the bacteria repellant agent is a non-ionic surfactant.

Advantageously, the masterbatch can be blended with polymer materials, such as thermoplastic polymers, to afford bacteria repellant properties to the thus formed polymer composite. Accordingly, the method of preparing the masterbatch may further comprise the step of blending the masterbatch with one or more polymers, such as thermoplastic polymers, thereby forming a bacteria repellant polymer composite.

The masterbatch and bacteria repellant polymer composite may also exhibit repellant properties to other pests, such as fungus, protozoa, parasites, and the like.

The porous thermoplastic polymer may be selected from any thermoplastic polymer including, but not limited to, polyolefins, cyclic polyolefins, polyacrylates, polymethacrylates, polyacetates, polycarbonates, polyurethanes, polyamides, and the like. In certain embodiments, the thermoplastic polymer includes homopolymers, copolymers and/or blends of polystyrene, polyethylene, polypropylene, polyester, polyacrylonitrile, polycarbonate, polyurethane, and thermoplastic elastomers.

In certain embodiments, the porous thermoplastic polymer is selected from the group consisting of polyurethane, styrene-ethylene-butylene-styrene block thermoplastic elastomer, polyolefin elastomer, thermoplastic polyester elastomer, thermoplastic vulcanizate, polyethylene, polypropylene, polystyrene, styrene-acrylonitrile copolymer, acrylonitrile-butadiene-styrene terpolymer, terephthalic acid-tetramethylcyclobutanediol-cyclohexanediol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate-based copolymer, methyl methacrylate-butadiene-styrene terpolymer, and blends and copolymers thereof.

In certain embodiments, the porous thermoplastic polymer is selected from the group consisting of low-density PE (LDPE), linear low-density PE (LLDPE), high-density PE (HDPE), and other polyethylene-based resins.

The porous thermoplastic polymer may comprise open cell pores, closed cell pores, and combinations thereof. In certain embodiments, the porous thermoplastic polymer has greater than 50%, greater than 60%, greater than 70%, greater than 90%, or greater than 90% open cell. In certain embodiments, the porous thermoplastic polymer has a porosity between 10-95%, 20-95%, 30-95%, 40-95%, 50-95%, 60-95%, 70-95%, or 80-95%. The specific surface area of the porous thermoplastic polymer can be 0.5-2.0 $m^2/g$, 1.0-2.0 $m^2/g$, 1.5-2.0 $m^2/g$, 0.5-1.5 $m^2/g$, or 0.5-1.0 $m^2/g$. The bulk density of the porous thermoplastic polymer can be between 30 to 250 g/L, 50 to 250 g/L, 100 to 250 g/L, 150 to 250 g/L, 200 to 250 g/L, 30 to 200 g/L, 30 to 150 g/L, or 30 to 100 g/L. In certain embodiments, the porous thermoplastic polymer has pores with an average diameter between 20-120 µm, 20-100 µm, 20-80 µm, 20-60 µm, 20-40 µm, 40-120 µm, 60-120 µm, 80-120 µm, or 100-120 µm.

Plasma treatment of the porous thermoplastic polymer can result in the formation of reactive radical and anionic moieties on the surface of the thus formed surface activated thermoplastic polymer. The reactive radical and anionic moieties can undergo chemical reaction with the non-ionic surfactant resulting in the grafting of the non-ionic surfactant to the surface of the porous thermoplastic polymer.

Plasma treatment of the porous thermoplastic polymer may also result in the formation of polar moieties on the surface of the thus formed surface activated thermoplastic polymer that can improve mixing and homogeneity of the mixture of the surface activated thermoplastic polymer and the non-ionic surfactant, which can result in greater stability of the resulting masterbatch.

Plasma treatment of the porous thermoplastic polymer can be accomplished using any gas. In certain embodiments, the plasma treatment utilizes oxygen, argon, nitrogen, carbon dioxide, or any combination thereof. Atmospheric pressure plasma or vacuum plasma can be used. The plasma treatment processing time can range from 10-750s at a power in the range of 10-1000 W. In certain embodiments, the plasma treatment is conducted for 1-60 min, 1-50 min, 1-40 min, 1-30 min, 1-20 min, 1-10 min, 5-10 min, 1-7 min, 3-7 min, or about 5 min. In certain embodiments, the plasma treatment is conducted at a power of 10-500 W, 10-400 W, 50-400 W, 100-400 W, 100-300 W, 150-300 W, 200-300 W, 180-270 W, 200-250 W, or 200-500 W.

In certain embodiments, the non-ionic surfactant is an alcohol polyoxyalkylene ether, polyoxyalkylene fatty acid, a polyoxyalkylene sorbitan, a polyoxyalkylene sorbitan fatty acid ester, a polyether glycol, and analogs and/or combinations thereof.

In certain embodiments, the non-ionic surfactant is polyethylene glycol sorbitan monolaurate, polyethylene glycol sorbitan monooleate, poly(ethylene glycol) sorbitol hexaoleate, polyethene-block-poly(ethylene glycol), and alkyl polyglycol ether C16-C18.

In certain embodiments, the non-ionic surfactant is an polyoxyethylene sorbitol hexaoleate, polyoxyethylene sorbitan monolaurate, polyoxyethylene lauryl ether, polyoxyethylene hydrogenated castor oil, polyoxyethylene cetyl/octadecyl ether, allyl polyethylene glycol, methoxy polyglycol silane, polyoxyethylene acrylate, polyoxyethylene methacrylate, polyoxyethylene vinyl ether, polyoxypropylene glycol, polyoxypropylene amine, polyoxypropylene acrylate, polyoxypropylene methacrylate, polyoxypropylene glyceryl ether and their derivatives. In certain embodiments, the polyoxyethylene part or the polyoxypropylene groups of the non-ionic surfactant each have molecular weights between 132 Da to 4,400 Da.

In certain embodiments, the non-ionic surfactant is selected from the group consisting of ceteareth-20, poly (ethylene glycol) sorbitol hexaoleate, polysorbate 80, PEG-40 hydrogenated castor oil, and combinations thereof.

The bacteria repellant agent can be present at a weight of 10-90 wt %, 20-90 wt %, 30-90 wt %, 40-90 wt %, 40-80 wt %, 50-80 wt %, 60-80 wt %, 60-70 wt %, or 70-80 wt % relative to the weight of the bacteria repellant agent and porous thermoplastic polymer.

The masterbatch may be prepared by two alternative methods, which are both contemplated by the present disclosure. In the first method, the porous thermoplastic polymer is first combined with the bacteria repellant agent before being subjected to plasma treatment. Alternatively, the porous thermoplastic polymer can be pre-treated with plasma before combining the bacteria repellant agent.

In certain embodiments, the step of blending the surface activated porous thermoplastic polymer with a bacteria repellant agent comprises blending by melting in a homogeneous phase in bulk or heterogeneous solid-liquid state. In certain embodiments, the step of blending the surface activated porous thermoplastic polymer with a bacteria repellant agent comprises the use of any conventional method, such as by the application of heat or at room temperature and with the help of machinery to mechanically mix the mixture under atmospheric pressure or negative pressure.

In certain embodiments, the thermoplastic polymer comprises polyurethane, styrene-ethylene-butylene-styrene block thermoplastic elastomer, polyolefin elastomer, thermoplastic polyester elastomer, thermoplastic vulcanizate, polyethylene, polypropylene, polystyrene, styrene-acrylonitrile copolymer, acrylonitrile-butadiene-styrene terpolymer, terephthalic acid-tetramethylcyclobutanediol-cyclohexane glycol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate copolymer or methyl methacrylate-butadiene-styrene terpolymer.

In certain embodiments, the thermoplastic polymer is selected from the group consisting of polyethylene, polypropylene, polystyrene, terephthalic acid-tetramethylcyclobutanediol-cyclohexane glycol copolymer, styrene-ethylene-butylene-styrene block thermoplastic elastomer, acrylonitrile-butadiene-styrene terpolymer, polycarbonate, thermoplastic vulcanizate, and combinations thereof.

The mass ratio of the masterbatch and the thermoplastic polymer can be between 1:99 to 1:1; 1:99 to 2:3; 1:99 to 3:7; 1:99 to 1:4; 1:99 to 1:9; or 2:98 to 7:9. In certain embodiments, the mass ratio of the masterbatch and the thermoplastic polymer is about 5:95.

The methods described herein may further comprise blending at least one additive selected from antioxidants, brighteners, nucleating agents, mold release agents, color stabilizers, UV stabilizers, fillers, plasticizers, impact modifiers, colorants, lubricants, antistatic agents, fire retardants, and anti-ester exchange agents with the masterbatch and/or the bacteria repellant polymer composite.

The masterbatch and bacteria repellant polymer composite can be prepared by blending or mixing the essential ingredients, and other optional components, as uniformly as possible employing any conventional blending means. Mixing can be performed in any way known to the person skilled in the art. Commonly used mixing devices are a tumbler mixer, a high-speed mixer; blenders, for example V blender, ribbon blender or a cone blender; mixers, for example a jet mixer, a planetary mixer or a Banbury mixer. During mixing the mixture can be preheated. Mixing can also be performed in a part of an extruder The bacteria repellant polymer composite can be molded into a shape such as a pellet, but also semi-finished product or an article. Suitable examples of processes in which the bacteria repellant polymer composite is formed into a shape include blow molding, injection molding, compression molding, thermoforming, film blowing, casting and extrusion compression molding. Film blowing is widely used to produce films. Injection molding and blow molding are widely used to produce articles such as, bottles, boxes and containers. Extrusion is widely used to produce articles for example rods, sheets and pipes.

Advantageously, the bacteria repellant polymer composite does not require an additional melt processing step prior to further molding, which reduces the cost of preparing articles comprising the bacteria repellant polymer composite described herein. Accordingly, in certain embodiments, the method for preparing the bacteria repellant polymer composite does not further comprise a melt processing step, such as by an extruder, e.g., single and twin screw extruders, Banburry mixing step or a melt blending step.

The bacteria repellant polymer composite described herein can be used in the preparation of plastic articles with germ-repellant function. The invention is also directed to the use of the bacteria repellant polymer composite for the preparation of an article. The article can be an article for the storage or transport of food or beverages.

In certain embodiments, the article is a pipe for the transport of a fluid. The fluid can be a beverage, for example water and for example a soft drink, wine, beer or milk.

In certain embodiments, the article is a flexible packaging. Suitable examples are films, sheets, plastic bags, containers, bottles, boxes and buckets. In certain embodiments, the bacteria repellant polymer composite is used for pharmaceutical packaging, such as for example in primary packaging that is in direct contact with the active pharmaceutical ingredient and includes blister packs, fluid bags, pouches, bottles, vials and ampoules.

In certain embodiments, the article is used in medical applications. Medical applications include for example closures, rigid bottles and ampoules, needle sheaths, plunger rods for single-use syringes, moldings to house diagnostic equipment, collapsible tube shoulders, blow-fill-seal products, collapsible tube bodies, film for primary and secondary medical and pharmaceutical packaging, disposable syringes, actuator bodies, specimen cups, mouldings to house diagnostic equipment, centrifuge tubes, multi-well micro-titration plates, trays, pipettes and caps and closures.

EXAMPLES

The scope of the present disclosure is not limited by any description below. The following examples or embodiments are for illustration only.

The incubation process of the microbial adsorption test on the molded disc sample is shown in the schematic diagram of FIG. 1. The process is based on the revised version of the ASTM WK66122. The plastic surface is characterized by incubating, washing, wiping and reculturing the plastic surface. The ability to repel bacterial adhesion. The initial inoculum concentration of *Escherichia coli* (ATCC® 8739 TM) and *Staphylococcus aureus* (ATCC® 6538P TM) is about $8\times10^8$ cells/ml in 1/500 NB solution and $8\times10^7$ cells/ml in 1/500 NB solution to attack the sample surface. Among them, 1/500 NB refers to a nutrient broth diluted 500 times and adjusted to pH 6.8-7.2. The results of the antibacterial adsorption test are illustrated by the following example.

The embodiments of the present invention can be better understood with reference to the examples provided below. The invention is not limited to the examples given here.

Preparation of Porous PE Plastic Masterbatch with Anti-microbial Adhesion Properties 1. Selection of Base Material for Porous PE Thermoplastic Polymer In different types of open-cell PE, the open-cell PE plastic base material shown in Table 1 was used.

TABLE 1

Porous PE thermoplastic polymer used in Example 1.

| Type | Brand | Manufacturer | Pore size (um) | Surface area (m²/g) | Porosity | Porosity Percentage | Bulk Density (g/L) |
|---|---|---|---|---|---|---|---|
| PE | MPC3110 | StarBetter ™ | 50 | 1 | 75% | 85% | 125 |

Open cell porous PE under the tradename MPC3110 by StarBetter™ was used as the porous thermoplastic polymer. MPC3110 has micron-level pore sizes, a large specific surface area, high open porosity, and good adsorption capacity.

2. Selection of Bacteria Repellant Modifier

In order to improve the properties of the bacteria repellant polymer composite, the bacteria repellant agent shown in Table 2 below was selected.

TABLE 2

Bacteria repellant agent used in Example 1.

| Modifier | Detail | Manufacturer |
|---|---|---|
| Eumulgin ™ B2 | Ceteareth-20 | BASF |

(3) Surface Treatment of Porous PE Thermoplastic Polymer

Before preparing porous PE plastic masterbatches with bacteria repellant properties, plasma treatment was used to physically and chemically modify the open-cell PE thermoplastic polymer to improve the surface adhesion, so that it can better interact with the bacteria repellant modifier. The specific surface plasma treatment conditions are shown in Table 3.

TABLE 3

The conditions of the plasma treatment porous PE thermoplastic polymer of Example 1.

| Basic Material | Gas | Power (W) | Time (s) |
|---|---|---|---|
| Porous PE | Oxygen | 200 | 300 |

(4) Preparation of PE Masterbatch

Add the bacteria repellant agent to the open-cell porous PE thermoplastic polymer treated by surface plasma technology in a 1:1 mass ratio and mix thoroughly under low-speed stirring to obtain PE masterbatch with bacteria repellant properties (bacteria repellant PE masterbatch).

Preparation of Bacteria-repellent Modified PE Products

The bacteria repellant PE masterbatch prepared above and commercial PE thermoplastic polymer sold under the tradename HMA-016 by ExxonMobil® are mixed uniformly in a color mixer at a weight ratio of 5:95, respectively. The mixture was then directly put into the injection molding machine for injection molding to obtain bacteria repellant PE polymer composites articles (such as plastic squares with flat surfaces, etc.).

Bacteria Repellent Effects of Bacteria Repellent PE Polymer Composites

Figure 6:
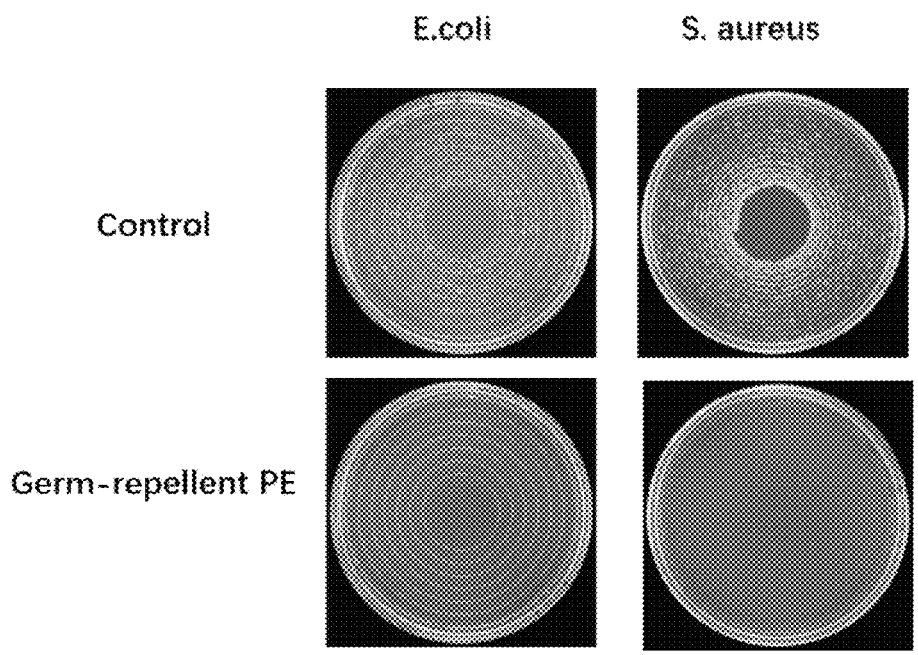
FIG. 6 depicts a representative *Escherichia coli* and *Staphylococcus aureus* absorption test results on specimens injection-molded from bacteria repellant PE resin prepared in accordance with certain embodiments described herein.

The bacteria repellant modified PE and pure PE were used as the experimental group and the control group, respectively. Three parallel samples of each sample were tested for their bacteria repellant effect in accordance with ASTM WK66122) (FIG. 6). The test results are shown in Table 4.

TABLE 4

The reduction of E. coli and Staphylococcus aureus colonies relative to the control group in the bacteria repellant PE polymer composite bacteria repellant test

| Sample | Reduced E. coli colonies | Reduced S. aureus colonies |
| --- | --- | --- |
| Bacteria repellant PE | 99.9% | 99.9% |

From the results in Table 4, it can be shown that the PE modified to repel bacteria shows good repellency and can reduce over 99% of bacterial adhesion.

Embodiment 2

Preparation of PP Masterbatch with Anti-microbial Adhesion Properties (1) Selection of Porous Thermoplastic Polymer Among different types of open-cell porous PP thermoplastic polymer, the open-cell PP plastic base material listed in Table 5 was used.

TABLE 5

Porous PP plastic base materials used in Example 2

| Type | Brand | Manufacturer | Pore size (um) | Surface aera (m²/g) | Porosity | Porosity percentage | Bulk Density (g/L) |
| --- | --- | --- | --- | --- | --- | --- | --- |
| PP | MPC1020 | StarBetter | 30 | 1.2 | 10% | 83% | 135 |

StarBetter MPC1020 open-cell porous PP thermoplastic polymer has a pore size between 20-120 microns, a large specific surface area, a high pore ratio, a large open porosity, and a high bulk density. It has good adsorption capacity for bacteria repellant agents described herein.

(2) Selection of Bacteria Repellant Agent

In order to improve the properties of the bacteria repellant polymer composite, the bacteria repellant agent shown in Table 6 below was selected.

TABLE 6

Bacteria repellant modifier used in Example 2

| Modifier | Detail | Manufacturer |
| --- | --- | --- |
| PEG-SHO | Poly(ethylene glycol) sorbitol hexaoleate | Sigma-Aldrich |
| Tween 80 | Polysorbate 80 | Mayer |

Polyethylene glycol sorbitol hexaoleate (PEG-SHO) is a non-ionic semi-synthetic surfactant, usually used as an emulsifier in foods, such as ice cream, and also as a surfactant in soaps and cosmetics. Tween 80 is a non-ionic surfactant and emulsifier, prepared by ethoxylation of sorbitan and oleic acid, an amber oily liquid, easily soluble in water due to its hydrophilic groups. It is a polymer of ethylene oxide, and is often used as an emulsifier in food.

(3) Surface Treatment of Porous PP Thermoplastic Polymer

Before preparing PP masterbatch, the open-cell porous PP thermoplastic polymer is physically and chemically modified by plasma treatment technology to improve surface adhesion, so that it can better interact with the bacteria repellant agent. The specific surface plasma treatment conditions are shown in Table 7.

TABLE 7

The conditions of the plasma treatment of the open-cell porous PP thermoplastic polymer of Example 2

| Basic material | Gas | Power | Time (s) |
| --- | --- | --- | --- |
| Porous PP | Oxygen | 250 | 300 |

4) Preparation of PP Masterbatch

The open cell porous PP thermoplastic polymer treated with PEG-SHO and Tween-80 are combined in a mass ratio of 25:25:50 and exposed to vacuum while mixing thoroughly under low-speed stirring to obtain a PP masterbatch with bacteria repellant properties (Repellant PP masterbatch).

Preparation of Bacteria-repellent Modified PP Products

The bacteria repellant PP masterbatch prepared above and commercial PP thermoplastic polymer (RP225N) are mixed uniformly in a color mixing machine at a weight ratio of 5:95, and the mixture is directly injection molded to obtain a bacteria repellant PP polymer composite square, which was used in bacteria repellency tests.

Bacteria Repellent Effect of Modified PP Products

Figure 7:
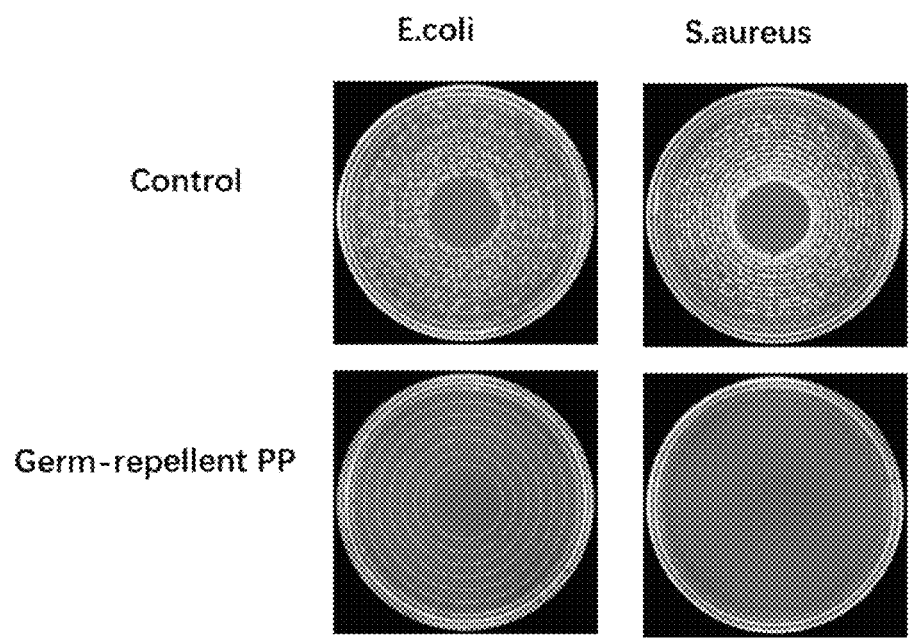
FIG. 7 depicts a representative *Escherichia coli* and *Staphylococcus aureus* absorption test results on specimens injection-molded from bacteria repellant PP resin prepared in accordance with certain embodiments described herein.

The bacteria repellant PP polymer composite and pure PP were used as the experimental group and the control group, respectively. Three samples of each were tested for their bacteria repellant effect according to ASTM WK66122 (FIG. 7). The test results are shown in Table 8.

TABLE 8

The decrease of E. coli and Staphylococcus aureus colonies relative to the control group in the bacteria repellant PP polymer composite

| Sample | Reduced E. coli colonies | Reduced S. aureus colonies |
| --- | --- | --- |
| Bacteria Repellant PP | 99.9% | 99.9% |

It can be seen from the results in Table 8 that PE modified to repel bacteria exhibits good repellency and can reduce over 99% of bacterial adhesion.

Embodiment 3

Use the PP masterbatch used prepare TPV and SEBS bacteria repellant polymer composites.

(1) Selection of Thermoplastic Polymer

Commercial TPV and SEBS listed in Table 9 were selected.

TABLE 9

TPV and SEBS thermoplastic polymers used in Example 3

| Material | Brand | Manufacturer |
| --- | --- | --- |
| TPV | Santoprene ™ 8271-55 | ExxonMobil ™ |
| SEBS | F.G100.A60.N | Elastron ™ |

2) Preparation of TPV and SEBS Bacteria Repellent Polymer Composites

The concentrated mixture of PP masterbatch prepared in Example 2 and commercial elastomers TPV and SEBS were mixed uniformly in a color mixing machine in a mass ratio of 5:95, respectively. Then the mixture was placed in an injection molding machine for injection molding to obtain a bacteria repellant TPV and SEBS polymer composites.

(3) Bacteria Repellent Effect of TPV and SEBS Polymer Composites

Figure 8:
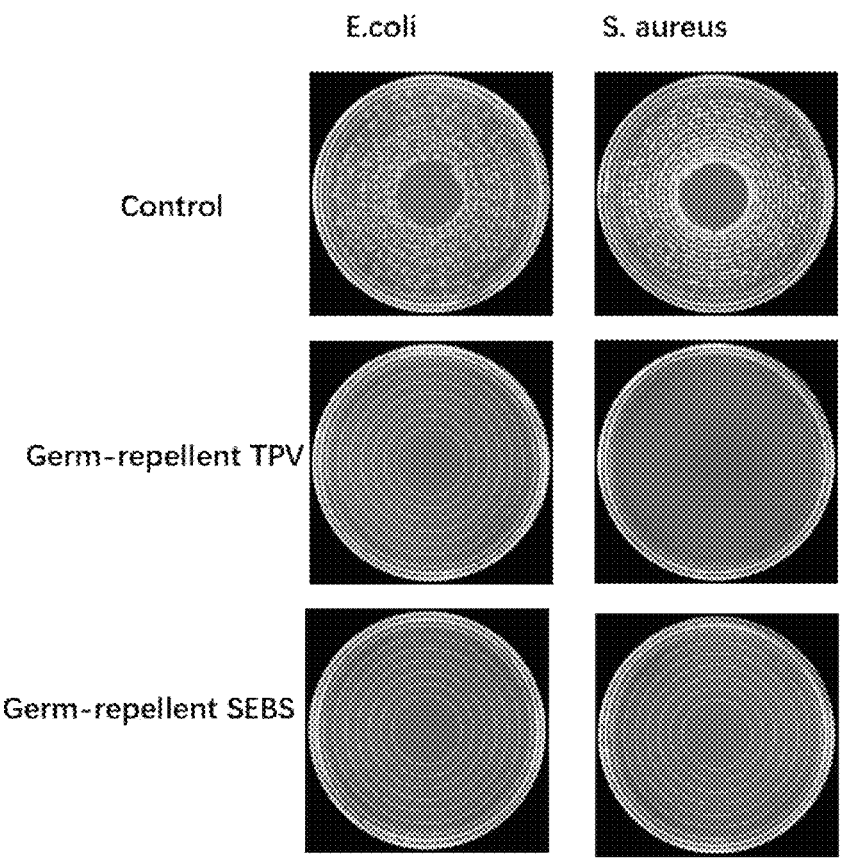
FIG. 8 depicts a representative *Escherichia coli* and *Staphylococcus aureus* absorption test results on specimens injection-molded from bacteria repellant TPV resin and SEBS resin prepared in accordance with certain embodiments described herein.

The bacteria repellant TPV and SEBS polymer composites were used as the experimental group, and pure TPV and pure SEBS were used as the control group. According to ASTM WK66122, three samples of each sample were tested for their bacteria-repellant effect (FIG. 8). The test results are shown in Table 10.

TABLE 10

The decrease of E. coli and Staphylococcus aureus colonies relative to the control group in the modified PP repellant test

| Sample | Reduced E. coli colonies | Reduced S. aureus colonies |
| --- | --- | --- |
| Bacteria repellant TPV | 98.9% | 99.5% |
| Bacteria repellant SEBS | 99.2% | 99.9% |

From the test results in Table 10, it can be shown that both bacteria repellant TPV and SEBS polymer composites can reduce over 99% of bacterial adhesion.

Example 4

Preparation of PS Masterbatch with Anti-microbial Adhesion Properties (1) Selection of Base Material for Open-Cell Porous PS Thermoplastic Polymer The open cell porous PS plastic thermoplastic polymer shown in Table 11 is used

TABLE 11

Porous PS thermoplastic polymer used in Example 4

| Type | Brand | Manufacturer | 3 | Surface aera ($m^2$/g) | Porosity | Porosity percentage | Bulk Density (g/L) |
| --- | --- | --- | --- | --- | --- | --- | --- |
| PS | MPC2005 | StarBetter ™ | 50 | 1 | 62% | 95% | 220 |

Porous open cell PS thermoplastic polymer sold under the tradename MPC2005 by StarBetter™ has a micron sized pores, a large specific surface area, high open porosity, and good adsorption capacity.

(2) Selection of Bacteria Repellant Agent

The bacteria repellant agents shown in Table 12 below were mixed with the open-cell porous PS thermoplastic polymer.

TABLE 12

Bacteria repellant modifier used in Example 4

| Modifier | Detail | Manufacturer |
| --- | --- | --- |
| PEG-SHO | Poly (ethylene glycol) sorbitol hexaoleate | Sigma-Aldrich |
| CO-40 | PEG-40 hydrogenated castor oil | BASF |
| Eumulgin ™ B2 | Ceteareth-20 | BASF |

(3) Surface Treatment of Open-Cell Porous PS Thermoplastic Polymer

The open cell porous PS plastic base material is physically and chemically modified by plasma treatment technology to improve surface adhesion so that it can be better combined with the bacteria repellant agents. The specific surface plasma treatment conditions are shown in Table 13.

TABLE 13

The conditions of plasma treatment of open-cell PE plastic masterbatch

| Basic material | Gas | Power (W) | Time (s) |
|---|---|---|---|
| Porous PS | Oxygen:Argon = 3:1 | 200 | 300 |

(4) Preparation of PS Masterbatch

The open cell porous PS thermoplastic polymer was treated with PEG-SHO, CO-40, and Eumulgin B2 in a mass ratio of 30:10:10:50, respectively. The mixture was exposed to plasma and then mixed thoroughly under low-speed stirring to obtain the PS masterbatch.

Preparation of Bacteria-repellent PS Polymer Composite Articles

The PS masterbatch prepared above and the pure PS thermoplastic polymer (Chimei PH-888G) are mixed uniformly in a color mixer at a weight ratio of 5:95, and the mixture is directly put injection molded to obtain bacteria repellant PS polymer composite articles which were tested for bacterial repellency.

Bacteria Repellent Effect of Bacteria Repellent PS Polymer Composites

Figure 9:
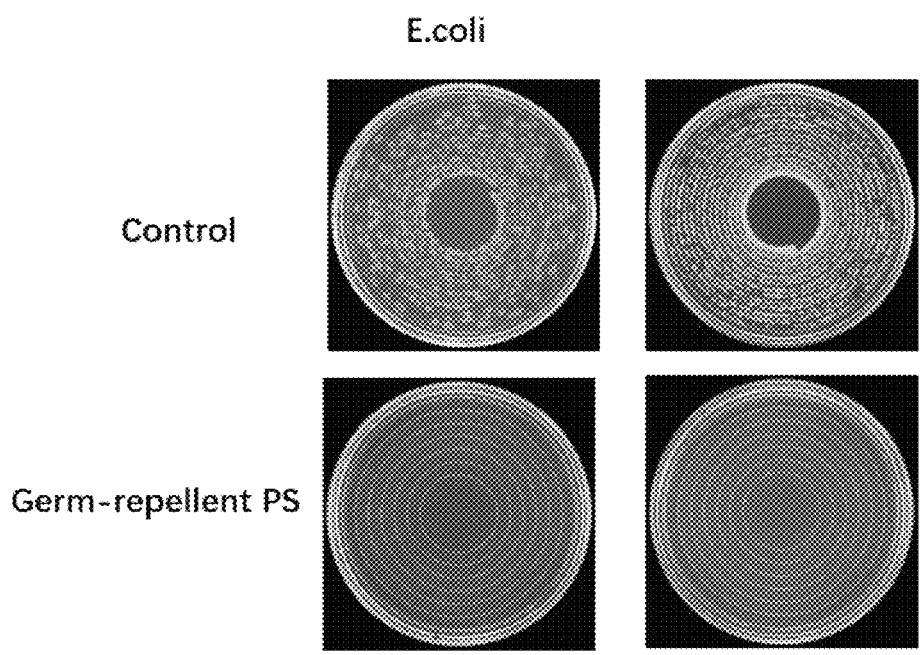
FIG. 9 depicts a representative *Escherichia coli* and *Staphylococcus aureus* absorption test results on specimens injection-molded from bacteria repellant PS resin prepared in accordance with certain embodiments described herein.

The bacteria repellant PS polymer composites and pure PS were used as the experimental group and the control group, respectively, according to ASTM WK66122 on three samples of each sample were used to test bacteria-repellant properties (FIG. 9). The test results are shown in Table 14.

TABLE 14

The decrease of *E. coli* and *Staphylococcus aureus* colonies relative to the control group in the bacteria repellant PS polymer composite.

| Sample | Reduced *E. coli* colonies | Reduced *S. aureus* colonies |
|---|---|---|
| Bacteria repellant PS | 99.3% | 99.5% |

It can be seen from the results in Table 14 that the bacteria repellant PE polymer composite exhibited good bacteria repellency and can reduce more than 99% of bacterial adhesion.

Embodiment 5

Using PS Masterbatch with Anti-microbial Adhesion Properties to Prepare PC, ABS, and Tritan™ Polymer Composites with Bacteria Repellent Properties (1) Selection of Thermoplastic Polymer Commercial TPV and SEBS listed in Table 15 below were selected.

TABLE 15

TPV and SEBS thermoplastic polymers used in Example 5

| Material | Brand | Manufacturer |
|---|---|---|
| PC | Makrolon 2407 | Covestro |
| Tritan ™ | TX2001 | Eastman |
| ABS | PA-757 | Chimei |

(2) Preparation of PC, Tritan™, and ABS Polymer Composites with Bacteria Repellant Function The PC, Tritan™, and ABS thermoplastic polymers were each uniformly mixed with the PS masterbatch prepared in Example 4 in a color mixing machine at a mass ratio of 95:5, respectively. The mixtures were directly injection molding to obtain bacteria repellant PC, Tritan™, and ABS polymer composite articles, which were tested for bacteria repellency.

Figure 10:
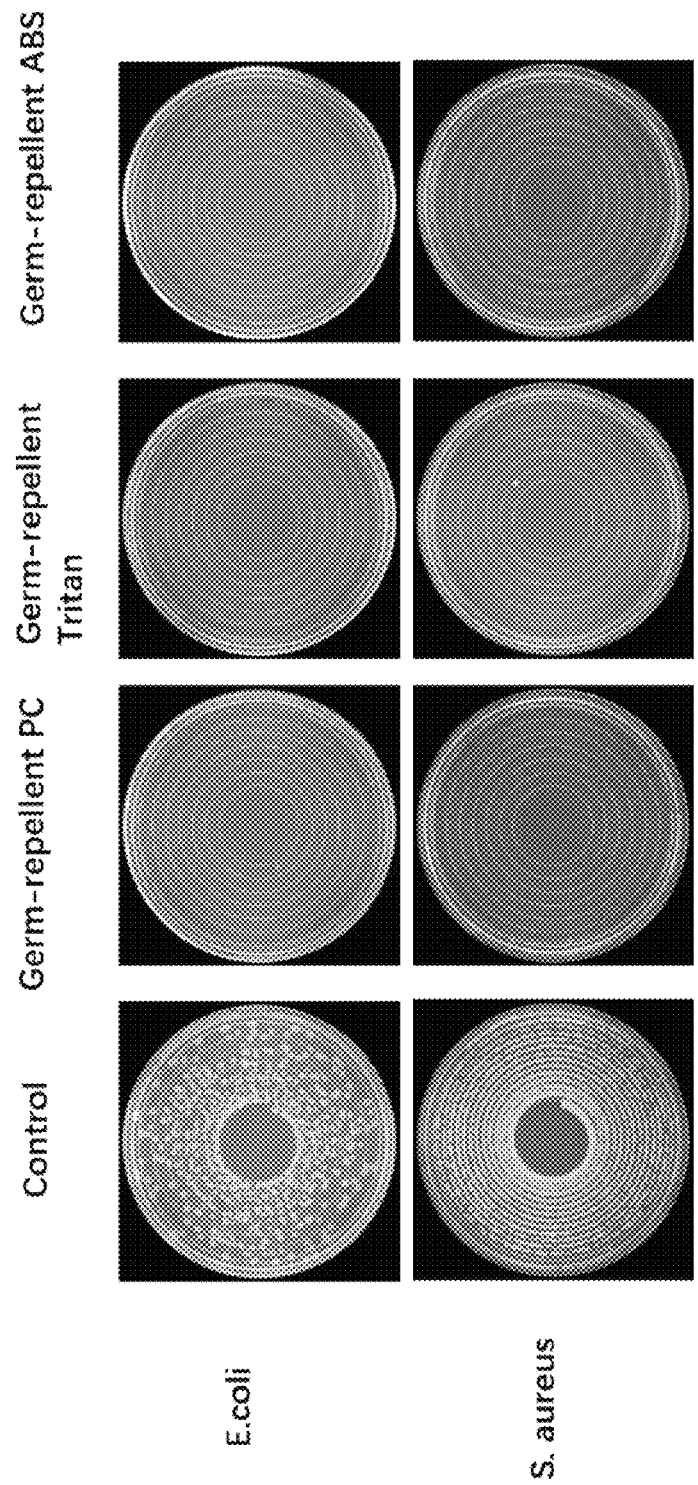
FIG. 10 depicts a representative *Escherichia coli* and *Staphylococcus aureus* absorption test results on specimens injection-molded from bacteria repellant PC, Tritan™, and ABS resin prepared in accordance with certain embodiments described herein.

(3) Testing of Bacteria Repellant PC, Modified Tritan™ and Modified ABS Polymer Composites The PC, Tritan™, and ABS polymer composites were used as the experimental group, and pure PC, Tritan™, and ABS were used as the control group. According to the ASTM WK66122, three samples of each sample were tested for their bacteria repellant effect (FIG. 10).

TABLE 16 shows the decrease of *E. coli* and *Staphylococcus aureus* colonies in the bacteria repellant polymer composites relative to the control group.

| Sample | Reduced *E. coli* colonies | Reduced *S. aureus* colonies |
|---|---|---|
| Bacteria repellant PC | 99.1% | 99.2% |
| Bacteria repellant Tritan ™ | 99.2% | 99.5% |
| Bacteria repellant ABS | 99.9% | 99.2% |

From the test results in Table 16, it can be seen that both bacteria repellant TPV and SEBS composite polymers show good bacteria repellency and can reduce over 99% of bacterial adhesion.

Comparative Examples 1-8

Use of Common Commercial Non-Porous Thermoplastic Polymers to Make Masterbatch and Product Processing (1) Choose Non-porous Thermoplastic Polymer The non-porous thermoplastic polymers used in the comparative examples are shown in Table 17.

TABLE 17

Non-porous thermoplastic polymers used

| Number | Basic material | Brand | Manufacturer |
|---|---|---|---|
| A | PP | RP225N | Basell ™ |
| B | PE | HMA-016 | Exxonmobil ™ |
| C | PS | PH-888G | Chimei ™ |
| D | PC | Makrolon ™ 2407 | Covestro ™ |
| E | Tritan ™ | TX 2001 | Eastman ™ |
| F | ABS | PA-757 | Chimei ™ |
| G | TPV | Santoprene ™ 8271-55 | ExxonMobil ™ |
| H | SEBS | F.G100.A60.N | Elastron |

2) Preparation of Bacteria-Repellant Masterbatch

Non-porous PP, PE, PS are used as non-porous thermoplastic polymers. The selected non-porous PP, PE, and PS thermoplastic polymers were subjected to plasma treatment according to the conditions in the following table. After treatment, they were mixed with the bacteria repellant agent shown in the following Table 18 at low speed at room temperature, and the prepared numbers were as shown in Table 18.

TABLE 18

Plasma surface treatment and bacteria repellant modification conditions

| Number | Polymer | Gas | Power | Time | Bacteria Repellant Agent | Ratio (mass) |
|---|---|---|---|---|---|---|
| 1 | PP | Oxygen | 250 | 300 | Eumulgin ™ B2 PEG-SHO | Eumulgin ™ B2:PEG-SHO:RP225N = 25:25:50 |
| 2 | PE | Oxygen | 200 | 300 | Polysorbate 80 | Polysorbate 80:HMA-016 = 50:50 |
| 3 | PS | 3:1 Oxygen:Argon | 200 | 300 | PEG-SHO CO-40 Eumulgin ™ B2 | PEG-SHO:CO-40:Eumulgin B2:PH-888G = 30:10:10:50 |

(3) After mixing the bacteria repellant agent masterbatch prepared in step 2 with the thermoplastic polymer selected in step 1 at a mass ratio of 5:95, the thermoplastic polymer is directly processed, and the results are shown in Table 19 below.

TABLE 19

Processing results of mixing the bacteria repellant agent masterbatch and thermoplastic polymer of Comparative Examples 1-8.

| Example | Closed cell masterbatch after plasma processing (X) | Basic thermoplastic polymer (Y) | Mixing ratio (X:Y) | Processing and forming process | Result |
|---|---|---|---|---|---|
| Example 1 | 1 | A | 5:95 | Injection molding processing | Screw slippage, not able to inject |
| Example 2 | 2 | B | 5:95 | Injection molding processing | Screw slippage, not able to inject |
| Example 3 | 1 | H | 5:95 | Injection molding processing | Screw slippage, not able to inject |
| Example 4 | 1 | G | 5:95 | Injection molding processing | Screw slippage, not able to inject |
| Example 5 | 3 | C | 5:95 | Injection molding processing | Screw slippage, not able to inject |
| Example 6 | 3 | D | 5:95 | Injection molding processing | Screw slippage, not able to inject |
| Example 7 | 3 | E | 5:95 | Injection molding processing | Screw slippage, not able to inject |
| Example 8 | 3 | F | 5:95 | Injection molding processing | Screw slippage, not able to inject |

As shown from the comparative results in Table 19, if a non-porous thermoplastic polymer is used in the methods described herein, the resulting masterbatch and thermoplastic resin cannot be directly injection molded due to screw slippage and leakage of the bacteria repellant agent from the masterbatch. This problem can be overcome by the methods described herein, which results in a more labor and cost efficient method for preparing bacteria repellant polymer composites.

Figure 2:
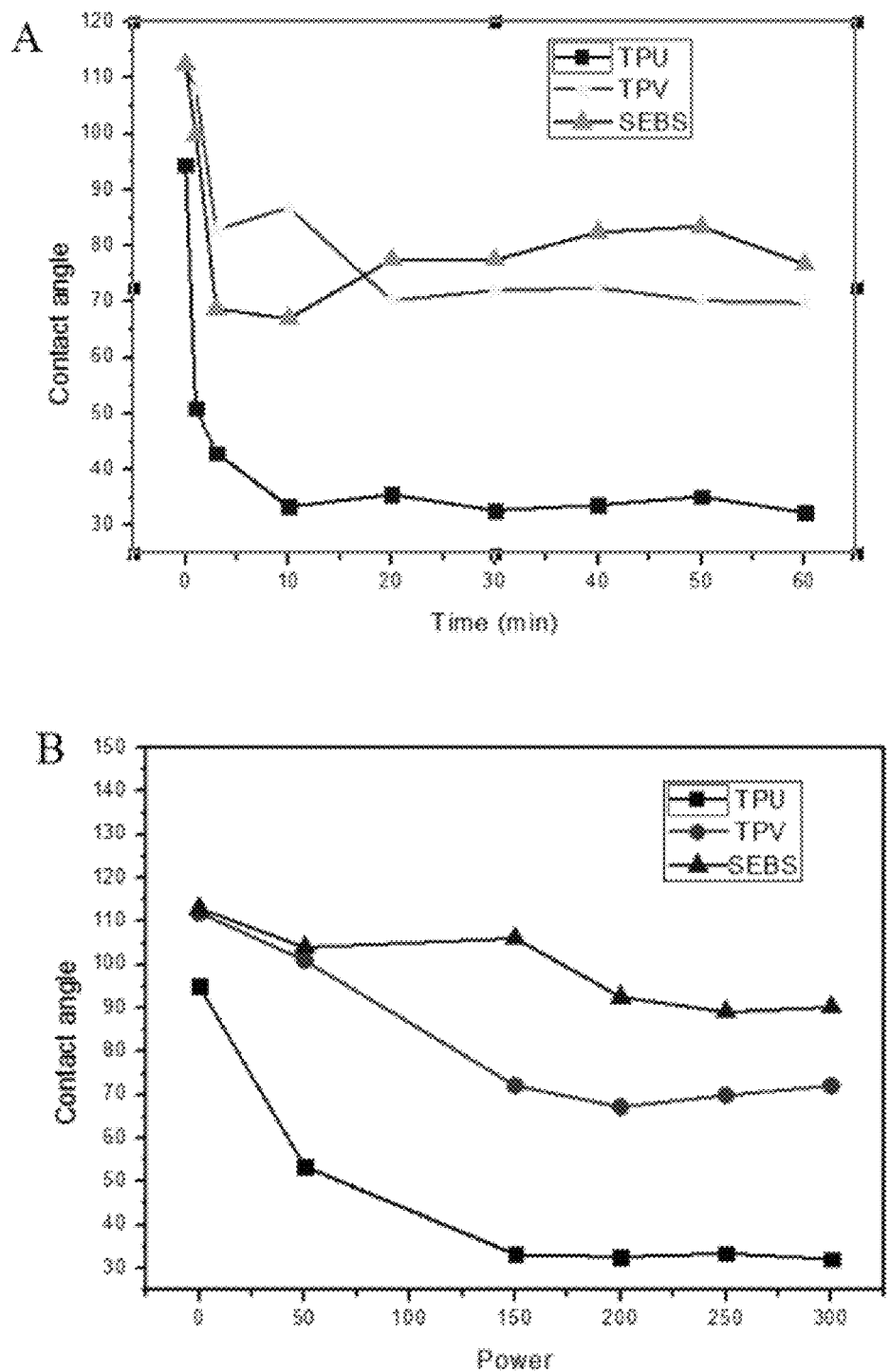
FIG. 2 depicts graphs showing the effect of (A) treatment time and (B) electric power on treated surface during plasma treatment on the contact angle of water on the treated surface.

Referring to FIG. 2, the effect of plasma treatment time and plasma electric power on water contact angle of the surface treated polymer surface was also studied.

Figure 3:
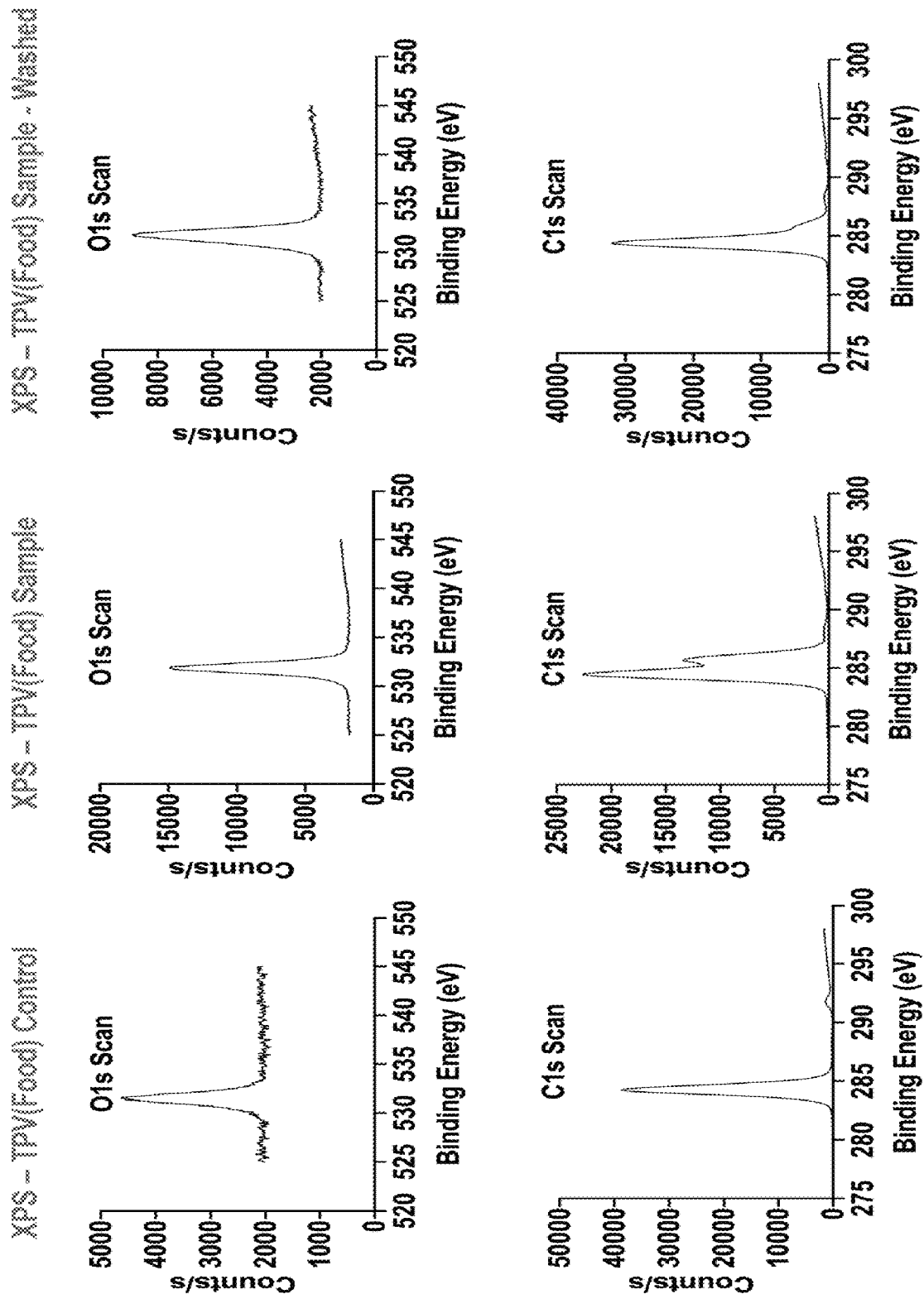
FIG. 3 depicts X-ray photoelectron spectroscopy (XPS) O1s and C1s peak of control TPV, Plasma treated TPV sample with modifier and washed plasma treated TPV sample.
Figure 4:
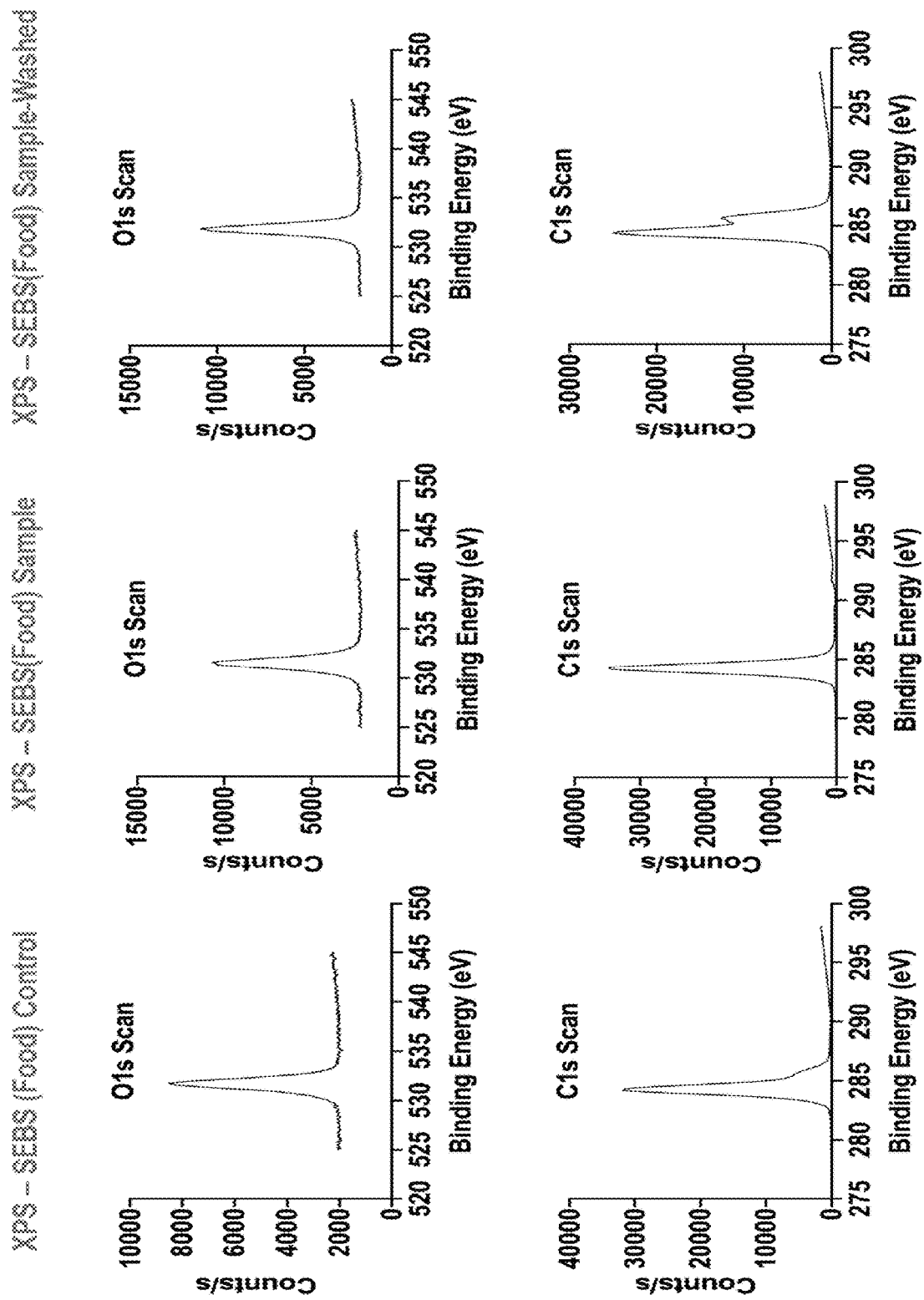
FIG. 4 depicts XPS O1s and C1s peak of control SEBS, Plasma treated SEBS sample with modifier and washed plasma treated SEBS sample.
Figure 5:
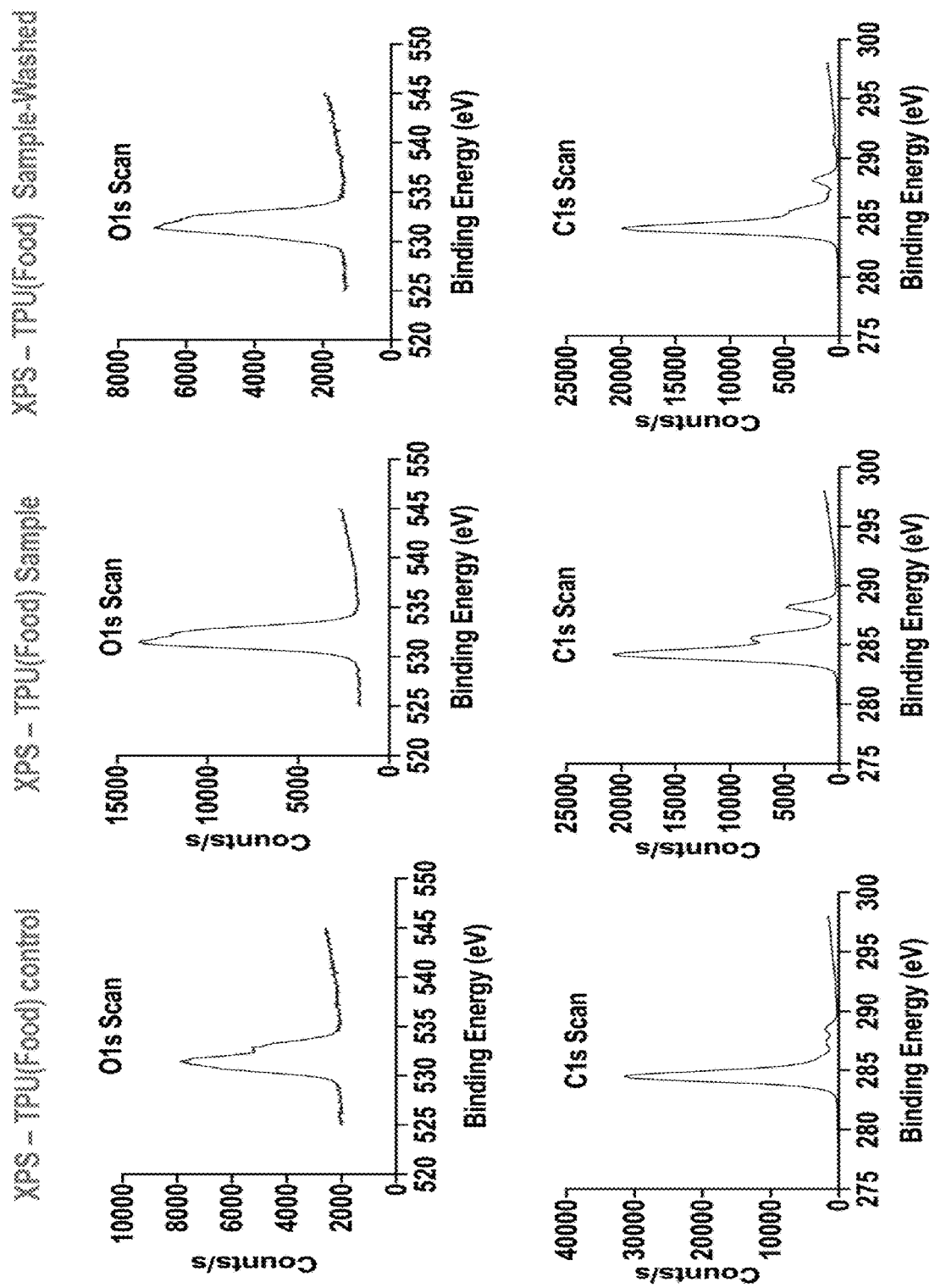
FIG. 5 depicts XPS O1s and C1s peak of control TPV, Plasma treated TPV sample with modifier and washed plasma treated TPV sample.

The grafting ratio of plasma-assisted melt grafting TPEs were measured by XPS. XPS of these materials were recorded in an (Model No.: Thermo Fisher ESCALAB 250 xi) using AlKa radiation (1486.6 eV). Binding energies were calculated with respect to C(1s) at 284.8 eV. Binding energies were measured with a precision of ±0.05 eV. For each set of the test, a control sample, treated sample, and washed treated sample were tested for Atomic ratio of Carbon and Oxygen signals. The XPS results and related calculated grafting ratios of selected germ-repellant resins are shown in FIG. 3-5. Take SEBS for example (FIG. 4), the Carbon to Oxygen ratio in a control sample is 91.86%:8.14%, this ratio increased to 88.85%:11.15% in a treated germ-repellant sample. The free (non-grafted) ceteareth-20 were rinsed thoroughly by water, so its Carbon to Oxygen ratio would reduce to 89.52%:10.48%, indicating a roughly 77% grafting ratio.

As shown in Table 20-22, the XPS shown a grafting ratio ranging from 36% to 77%, proving that plasma treatment is an efficient method and processing condition for germ-repellant modification.

TABLE 20

The C1s and O1s peak analysis and grafting ratio calculated from XPS study for TPV sample.

| Name | TPV(Food) control (Atomic %) | TPV(Food) Sample (Atomic %) | TPV(Food) Sample-Washed (Atomic %) | Grafting Ratio |
|---|---|---|---|---|
| C1s | 96.57 | 85.33 | 90.19 | 56% |
| O1s | 3.43 | 14.67 | 9.81 | |

TABLE 21

The C1s and O1s peak analysis and grafting ratio calculated from XPS study for SEBS sample.

| Name | SEBS(Food) control (Atomic %) | SEBS(Food) Sample (Atomic %) | SEBS(Food) Sample-Washed (Atomic %) | Grafting Ratio |
|---|---|---|---|---|
| C1s | 91.86 | 88.85 | 89.52 | 77% |
| O1s | 8.14 | 11.15 | 10.48 | |

TABLE 22

The C1s and O1s peak analysis and grafting ratio calculated from XPS study for TPU sample.

| Name | TPU(Food) control (Atomic %) | TPU(Food) Sample (Atomic %) | TPU(Food) Sample - Washed (Atomic %) | Grafting Ratio |
|---|---|---|---|---|
| C1s | 88.89 | 78.14 | 84.95 | 36% |
| O1s | 11.11 | 21.86 | 15.05 | |

The technical features of the above-mentioned embodiments can be combined arbitrarily. In order to make the description concise, this specification does not describe all possible combinations of the various technical features in the above-mentioned embodiments. However, as long as there is no contradiction in the combination of these technical features, it should be regarded as the scope of this specification. Moreover, the above-mentioned embodiments only express several embodiments of the present invention, and their description is more specific and detailed, but they cannot be understood as a limitation on the scope of the invention patent.

It should be pointed out that for those of ordinary skill in the art, without departing from the concept of the present invention, several modifications and improvements can be made, and these all fall within the protection scope of the present invention. Therefore, the protection scope of the patent of the present invention should be subject to the appended claims.

What is claimed is:

1. A method of preparing a bacteria repellant polymer composite, the method comprising exposing the surface of a porous thermoplastic polymer to plasma thereby forming a surface activated porous thermoplastic polymer; blending the surface activated porous thermoplastic polymer with a bacteria repellant agent thereby grafting the bacteria repellant agent to a surface of the activated porous thermoplastic polymer and forming a masterbatch; and combining the masterbatch with a thermoplastic polymer thereby forming the bacteria repellant polymer composite, wherein the bacteria repellant agent is a non-ionic surfactant.

2. The method of claim 1, wherein the bacteria repellant polymer composite does not comprise a bactericide.

3. The method of claim 1, wherein the porous polymer has a porosity between 50-95%.

4. The method of claim 1 further comprising the step of injection molding the bacteria repellant polymer composite.

5. The method of claim 4, wherein the method does not further comprise a screw extrusion step, Banburry mixing step or a melt blending step.

6. The method of claim 1, wherein the porous thermoplastic polymer is selected from the group consisting of polyurethane, styrene-ethylene-butylene-styrene block thermoplastic elastomer, polyolefin elastomer, thermoplastic polyester elastomer, polyethylene, polypropylene, polystyrene, styrene-acrylonitrile copolymer, acrylonitrile-butadiene-styrene terpolymer, terephthalic acid-tetramethylcyclobutanediol-cyclohexanediol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate-based copolymer, methyl methacrylate-butadiene-styrene terpolymer, and combinations thereof.

7. The method of claim 1, wherein the porous thermoplastic polymer is selected from the group consisting of polyethylene, polypropylene, polystyrene, acrylonitrile-butadiene-styrene terpolymer, and combinations thereof.

8. The method of claim 1, wherein the non-ionic surfactant is selected from the group consisting of a fatty alcohol polyoxyalkylene ether, a polyoxyalkylene fatty acid, a polyoxyalkylene sorbitan, a polyoxyalkylene sorbitan fatty acid ester, a polyether glycol, and combinations thereof.

9. The method of claim 1, wherein the non-ionic surfactant is selected from the group consisting of polyoxyethylene sorbitol hexaoleate, polyoxyethylene sorbitan monolaurate, polyoxyethylene lauryl ether, polyoxyethylene hydrogenated castor oil, polyoxyethylene cetyl/octadecyl ether, allyl polyethylene glycol, methoxypolyglycol silane, polyoxyethylene acrylate, polyoxyethylene methacrylate, polyoxyethylene vinyl ether, polyoxypropylene glycol, polyoxypropylene amine, polyoxypropylene acrylate, polyoxypropylene methacrylate, polyoxypropylene glyceryl ether, and combinations thereof.

10. The method claim 1, wherein the non-ionic surfactant is selected from the group consisting of polyoxyethylene cetyl/octadecyl ether, poly(ethylene glycol) sorbitol hexaoleate, polyoxyethylene sorbitan monolaurate, polyoxyethylene hydrogenated castor oil, and combinations thereof.

11. The method of claim 10, wherein the non-ionic surfactants comprising polyethylene glycol groups have polyethylene glycol groups having an average molecular weight of 132 to 4,400 Da.

12. The method of claim 1, wherein the mass ratio of the bacteria repellant agent to the porous thermoplastic polymer is 1:9 to 4:1.

13. The method of claim 1, wherein the thermoplastic polymer is selected from the group consisting of polyurethane, styrene-ethylene-butylene-styrene block thermoplastic elastomer, polyolefin elastomer, thermoplastic polyester elastomer, thermoplastic vulcanizate, polyethylene, polypropylene, polystyrene, styrene-acrylonitrile copolymer, acrylonitrile-butadiene-styrene terpolymer, terephthalic acid-tetramethylcyclobutanediol-cyclohexane glycol copolymer, polylactic acid, polymethyl methacrylate, polyethylene terephthalate, polycarbonate, polymethylpentene, polyamide, polyvinyl chloride, ethylene-vinyl acetate copolymer, styrene-methacrylate copolymer, methyl methacrylate-butadiene-styrene terpolymer, and combinations thereof.

14. The method of claim 1, wherein the thermoplastic polymer is selected from the group consisting of polyethylene, polypropylene, polystyrene, terephthalic acid-tetramethylcyclobutanediol-cyclohexane glycol copolymer, styrene-ethylene-butylene-styrene block thermoplastic elastomer, acrylonitrile-butadiene-styrene terpolymer, polycarbonate, thermoplastic vulcanizate, and combinations thereof.

15. The method of claim 1, wherein the mass ratio of the masterbatch and the thermoplastic polymer is between 1:99 to 1:4.

16. The method of claim 1 further comprising the step of combining the masterbatch with one or more additives selected from the group consisting of antioxidants, brighteners, nucleating agents, and anti-ester exchange agents.

17. The method of claim 1, wherein the method comprises exposing the surface of a porous thermoplastic polymer selected from the group consisting of polyethylene, polypropylene, polystyrene, acrylonitrile-butadiene-styrene terpolymer, and combinations thereof, wherein the porous thermoplastic polymer has a porosity of 60-95% to plasma selected from oxygen, nitrogen, carbon dioxide, argon, and combinations thereof thereby forming a surface activated porous thermoplastic polymer; blending the surface activated porous thermoplastic polymer with a bacteria repellant agent selected from the group consisting of ceteareth-20, poly(ethylene glycol) sorbitol hexaoleate, polysorbate 80, PEG-40 hydrogenated castor oil, and combinations thereof, wherein the bacteria repellant agent and the porous thermoplastic polymer are present in a mass ratio of 1:1 to 4:1, respectively; thereby grafting the bacteria repellant agent to a surface of the activated porous thermoplastic polymer and forming a masterbatch; combining the masterbatch with a thermoplastic polymer in a mass ratio of 1:99 to 10:90, respectively; thereby forming the bacteria repellant polymer composite; and injection molding the bacteria repellant polymer composite.

18. The method of claim 17, wherein the bacteria repellant polymer composite is not subjected to a screw extrusion step, Banburry mixing step or a melt blending step.

19. The method of claim 17, wherein the bacteria repellant polymer composite does not comprise a bactericide.

20. A bacteria repellant polymer composite prepared in accordance with the method of claim 1.

* * * * *